United States Patent
Falk et al.

(10) Patent No.: US 10,528,484 B2
(45) Date of Patent: Jan. 7, 2020

(54) DEVICE AND METHOD FOR PROTECTING A SECURITY MODULE FROM MANIPULATION ATTEMPTS IN A FIELD DEVICE

(75) Inventors: Rainer Falk, Poing (DE); Steffen Fries, Baldham (DE)

(73) Assignee: Siemens Mobility GmbH, Munich (DE)

( * ) Notice: Subject to any disclaimer, the term of this patent is extended or adjusted under 35 U.S.C. 154(b) by 59 days.

(21) Appl. No.: 13/979,731

(22) PCT Filed: Dec. 15, 2011

(86) PCT No.: PCT/EP2011/072904
§ 371 (c)(1),
(2), (4) Date: Jul. 15, 2013

(87) PCT Pub. No.: WO2012/095237
PCT Pub. Date: Jul. 19, 2012

(65) Prior Publication Data
US 2013/0305062 A1    Nov. 14, 2013

(30) Foreign Application Priority Data

Jan. 14, 2011  (DE) .......................... 10 2011 002 706

(51) Int. Cl.
*G06F 11/30*  (2006.01)
*G06F 12/14*  (2006.01)

(52) U.S. Cl.
CPC ............................... *G06F 12/1408* (2013.01)

(58) Field of Classification Search
CPC .... G06F 21/10; G06F 21/86; G11B 20/00086
See application file for complete search history.

(56) References Cited

U.S. PATENT DOCUMENTS

| | | | |
|---|---|---|---|
| 5,574,430 A * | 11/1996 | Ott | G08B 13/1463 340/566 |
| 5,805,711 A | 9/1998 | Windel et al. | |
| 7,343,496 B1 * | 3/2008 | Hsiang | G06F 21/572 713/194 |
| 7,953,987 B2 | 5/2011 | Buscaglia et al. | |
| 8,188,860 B2 * | 5/2012 | Haid | G08C 25/00 340/3.7 |

(Continued)

FOREIGN PATENT DOCUMENTS

| | | |
|---|---|---|
| CN | 101261663 A | 9/2008 |
| DE | 4344476 A1 | 6/1995 |

(Continued)

*Primary Examiner* — John B King
*Assistant Examiner* — Darshan I Dhruv
(74) *Attorney, Agent, or Firm* — Laurence Greenberg; Werner Stemer; Ralph Locher

(57) ABSTRACT

A device for protecting a security module from manipulation attempts in a field device. A control device is configured to control the field device, a security module is configured to provide cryptographic key data which is to be used by the control device, and an interface device is connected to the control device. The security module is configured to allow the control device access to the cryptographic key data in the security module and to prevent access to the cryptographic key data in the event of a manipulation attempt on the field device.

18 Claims, 2 Drawing Sheets

(56) References Cited

U.S. PATENT DOCUMENTS

| | | | |
|---|---|---|---|
| 2003/0235306 A1* | 12/2003 | Fox | G06F 21/6209 380/255 |
| 2005/0039040 A1* | 2/2005 | Ransom | G01R 22/066 726/6 |
| 2006/0077607 A1* | 4/2006 | Henricks | G06Q 10/06 361/93.1 |
| 2006/0101288 A1* | 5/2006 | Smeets | G06F 21/602 713/194 |
| 2006/0225142 A1* | 10/2006 | Moon | G06F 21/6218 726/34 |
| 2007/0255966 A1* | 11/2007 | Condorelli | G06F 21/87 713/194 |
| 2008/0147345 A1* | 6/2008 | Willcock | G01B 21/26 702/87 |
| 2008/0222430 A1* | 9/2008 | Buscaglia | G06F 21/86 713/194 |
| 2008/0244217 A1 | 10/2008 | Baum et al. | |
| 2009/0055612 A1* | 2/2009 | Sibert | G06F 12/145 711/163 |
| 2009/0060194 A1* | 3/2009 | Mackey | G06F 21/554 380/277 |
| 2009/0106563 A1* | 4/2009 | Cherpantier | G06F 21/86 713/194 |
| 2010/0058077 A1* | 3/2010 | Matsuda | G06F 21/78 713/194 |
| 2010/0242088 A1 | 9/2010 | Thomas | |
| 2010/0313056 A1* | 12/2010 | Margolis | G06F 1/263 713/500 |
| 2011/0140911 A1* | 6/2011 | Pant | H04B 3/546 340/870.02 |

FOREIGN PATENT DOCUMENTS

| | | |
|---|---|---|
| DE | 102006014133 A1 | 10/2007 |
| DE | 102007016170 A1 | 10/2008 |
| DE | 202007018769 U1 | 4/2009 |
| DE | 102008051158 A1 | 5/2009 |
| DE | 102007055248 A1 | 6/2009 |
| WO | 2008103921 A1 | 8/2008 |

* cited by examiner

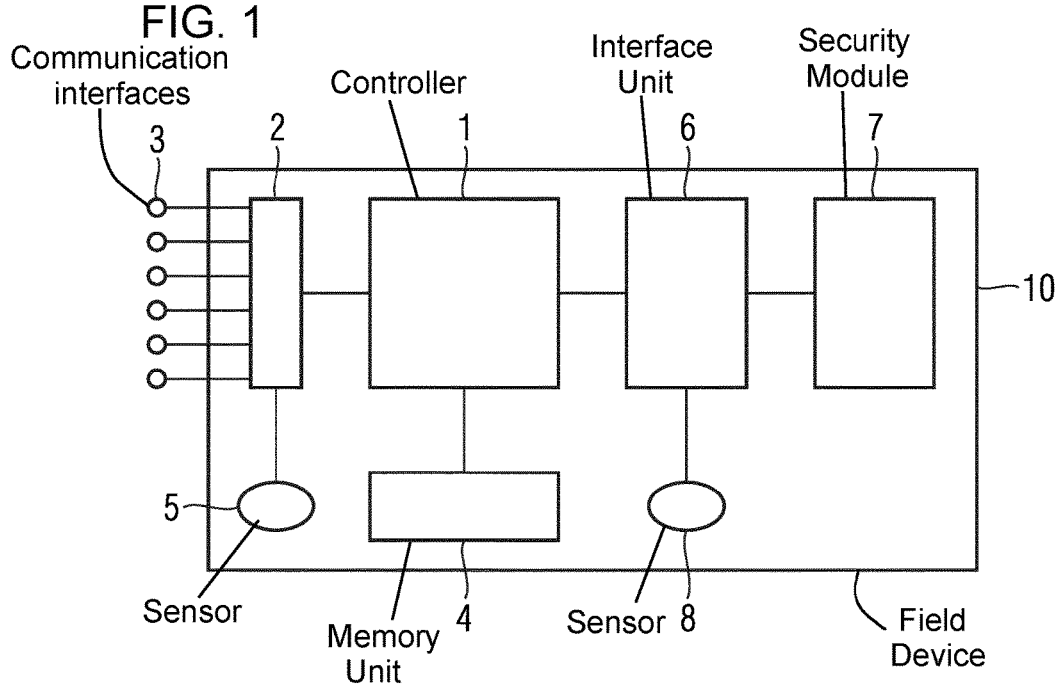
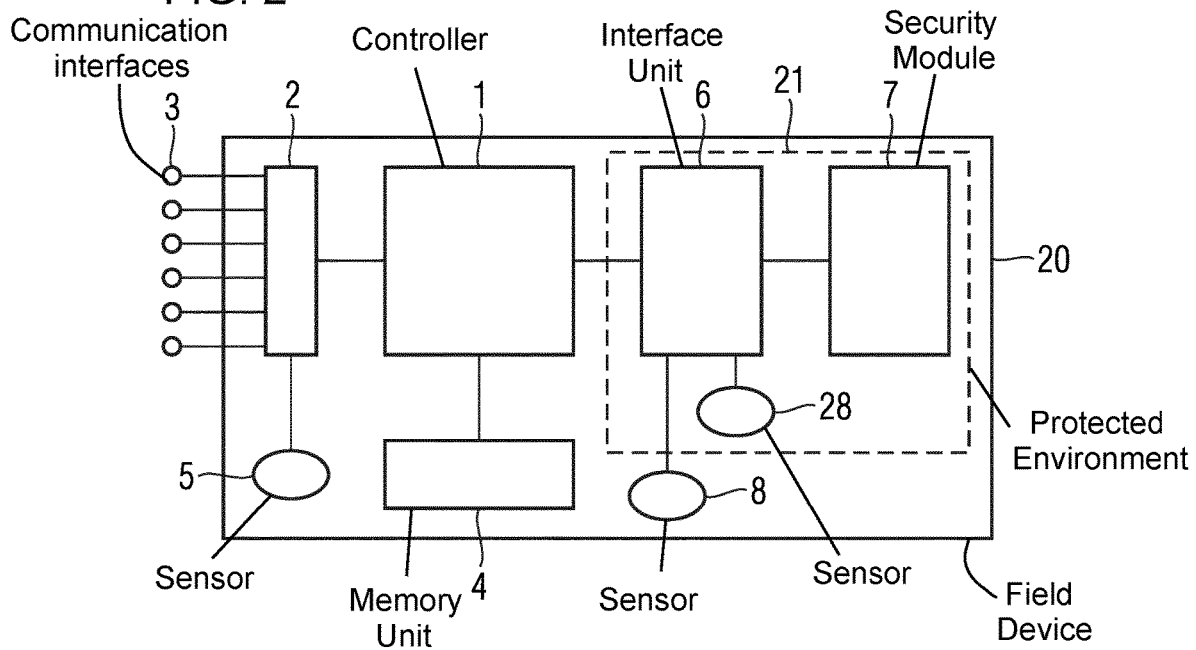

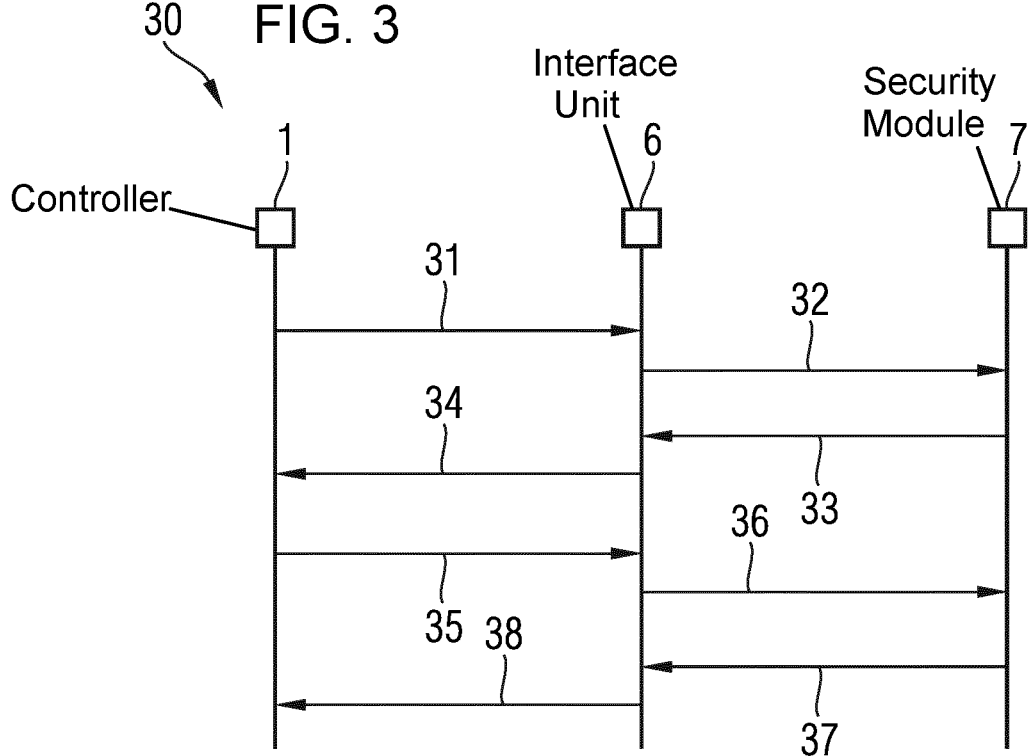
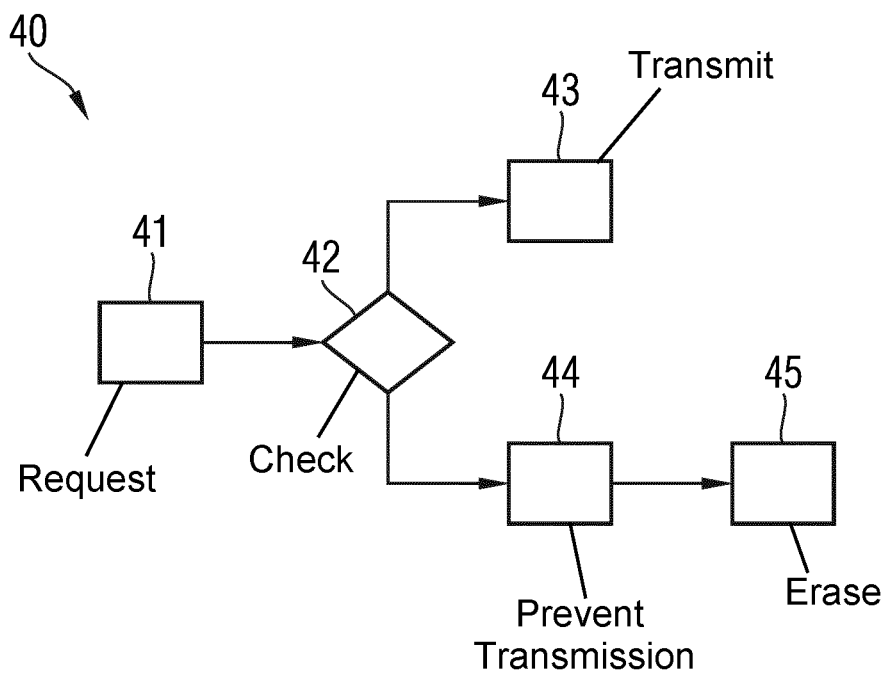

DEVICE AND METHOD FOR PROTECTING A SECURITY MODULE FROM MANIPULATION ATTEMPTS IN A FIELD DEVICE

The present invention relates to a device and a method for protecting a security module from manipulation attempts, in particular in field devices having tamper protection.

BACKGROUND ART

Industrial field devices, such as, for example, control devices for railroad and track installations, for controlling traffic lights or variable traffic signs, or for monitoring pipelines, are mostly to be found in areas that are accessible to the public or that are difficult for the operator to monitor, which means that technically it cannot be ruled out that unauthorized third parties can gain access to a field device and perpetrate manipulation attempts thereon. In this context the term "tampering" is also used to describe unauthorized interventions and manipulations.

Because field devices possess integrated security functionality, by means of which for example external communication with control centers or computer centers is safeguarded by cryptographic mechanisms, it is necessary to provide corresponding security-relevant data that is required by the field device in order to function correctly with adequate protection against tampering.

Suitable candidates for storing security-relevant data such as cryptographic communication keys for example are basically security chips specifically provided for this function, for example security ICs, which not only store the key data securely but also perform essential chip-internal cryptographic calculations with the key data. Here, the security chip itself is in most cases tamper-protected, which is to say embedded in a suitable manipulation-protected environment.

However, security chips of said type cannot be provided with external tamper or manipulation sensors by means of which manipulation attempts outside the manipulation-protected environment in which the chip itself is embedded can be registered. It is nonetheless desirable, even in the case of such manipulation attempts, to be able to guarantee the confidentiality of the security-relevant data on the security chip.

In the prior art the arithmetic logic unit or controller of the field device has hitherto been responsible for initiating security measures in the event of a manipulation attempt on the field device. For that purpose the controller must be in an active operating mode. Often, however, the controller has been switched to an inactive state or even is not operational or not supplied with sufficient electric power when a manipulation occurs.

There is therefore a need for solutions with the aid of which suitable security measures for safeguarding the confidentiality of security-relevant data in a security chip of a field device can be reliably, efficiently and quickly initiated when attempts are made to manipulate the field device.

SUMMARY OF THE INVENTION

One idea of the present invention is to provide an intermediate interface between a controller of a field device and a conventional security module, which intermediate interface monitors the exchange of security-relevant data between the controller and the security module and is able to initiate necessary measures for maintaining the confidentiality of the security-relevant data independently in the event of manipulation attempts on the field device. The intermediate interface emulates a conventional communication partner both for the controller and for the security module, so no changes to the existing communication protocols are necessary.

An embodiment variant of the present invention as claimed therefore consists in a device for protecting a security module from manipulation attempts in a field device, said device comprising a controller which is configured for controlling the field device, a security module which is configured for making cryptographic key data available for use by the controller, and an interface unit which is connected to the controller and the security module and which is configured for enabling the controller to access the cryptographic key data made available in the security module and for preventing access to the cryptographic key data in the event of an attempted manipulation of the field device. This offers the advantage of enabling field devices to be fitted with conventional security modules in an efficient and cost-effective way without the necessity of changing existing components of the field device.

According to a preferred embodiment variant the device comprises manipulation sensors which are connected to the interface unit and which are configured for detecting manipulation attempts on the field device or to breach a manipulation-protected environment of the security module and indicating same to the interface unit. This enables the interface unit to initiate suitable security measures automatically and without support from the controller in the event of manipulation attempts. Security measures to safeguard the cryptographic key data can therefore be initiated quickly and reliably, in particular when the controller is in the inactive state.

The interface unit is preferably a hardware module, for example a programmable logic device. This offers the advantage that the interface unit can be embodied in a compact, affordable and functionally appropriate design that is fit for purpose.

According to an advantageous embodiment variant the device additionally comprises a power supply unit which is connected to the interface unit and which is configured for supplying the interface unit at least temporarily with electric power. This has the advantage that when manipulation attempts are detected it is not necessary to activate the controller first in order to initiate security measures. It is particularly advantageous if, even in the event of other power supplies of the field device and/or of the controller being interrupted, the interface unit remains supplied with electric power at least until suitable safeguarding measures for maintaining the confidentiality of the cryptographic key data have been carried out in the security module.

The present invention also provides a method as claimed in claim 8 for protecting a security module from manipulation attempts in a field device, said method comprising the steps of:

sending a request by a controller in the field device for cryptographic key data of a security module to an interface unit;

checking in the interface unit to determine whether a manipulation attempt on the field device has been detected;

transmitting the cryptographic key data of the security module to the controller by the interface unit if no manipulation attempt has been detected; and preventing the transmission of the cryptographic key data of the security module to the controller by the interface unit if a manipulation attempt has been detected.

In addition the cryptographic key data will advantageously be erased in the security module by the interface unit if a manipulation attempt has been detected. In this way it can advantageously be made impossible for cryptographic key data in the security module to be read out by unauthorized third parties if a manipulation has been perpetrated on the field device.

According to an embodiment variant an authentication of the controller to the security module or a communication of the controller with the security module is prevented or blocked by the interface unit. A possibly unauthorized access to the cryptographic key data can therefore be prevented if a manipulation is suspected.

The invention furthermore provides a field device as claimed in claim 15 comprising an inventive device for protecting a security module from manipulation attempts.

Further modifications and variations will become apparent from the features of the dependent claims.

BRIEF DESCRIPTION OF THE FIGURES

Various embodiment variants and embodiments of the present invention will now be described in greater detail with reference to the accompanying drawings, in which:

FIG. 1 shows a schematic representation of a field device having a device for protecting a security module according to an embodiment variant of the invention;

FIG. 2 shows a schematic representation of a field device having a device for protecting a security module according to another embodiment variant of the invention;

FIG. 3 shows a schematic workflow of a method for communicating with a device for protecting a security module according to another embodiment variant of the invention; and FIG. 4 shows a schematic representation of a method for protecting a security module according to another embodiment variant of the invention.

The embodiments and developments described can be combined with one another as desired, insofar as this is beneficial. Other possible embodiments, developments and implementations of the invention also include combinations (not explicitly cited) of features of the invention that have been described hereinabove or will be described in the following with reference to the exemplary embodiments.

The accompanying drawings are intended to impart a further understanding of the embodiment variants of the invention. They illustrate embodiment variants and serve in conjunction with the description to explain principles and concepts of the invention. Other embodiment variants and many of the cited advantages will become apparent with regard to the drawings. The elements of the drawings are not necessarily shown true to scale in relation to one another. Like reference signs in the drawings denote like or like-acting components.

DETAILED DESCRIPTION OF THE INVENTION

In the following, manipulation sensors within the context of the present description can encompass all sensing and/or measuring devices which are able to detect physical interventions to breach the monitored device and transmit corresponding indicator signals to the associated arithmetic logic units or controllers. Sensing and/or measuring devices of said type can for example detect changes to the normal state which accompany a tamper intervention or a manipulation of the monitored device based on light, ion beams, temperature, pressure, electrical resistance, electrical voltage or similar physical effects. Manipulation sensors, within the meaning of this description, can therefore include, for example, switches, tamper foils (e.g. a so-called "wire mesh" or a conductive grid security foil), photoelectric sensors, capacitive arrangements, light-sensitive sensor surfaces or similar devices. It should be clear that other sensing and/or measuring devices having similar functionality can also constitute manipulation sensors within the meaning of this description.

FIG. 1 shows a schematic representation of a field device 10 comprising a device for protecting a security module 7. The field device 10 can be, for example, a control device for a railroad or track installation, for controlling a switch point, a barrier or a signal, for example. On the other hand the field device 10 can be any other remotely located device, such as a pipeline monitoring device, a weather station or traffic lights, for example. The field device 10 comprises a controller 1 which can control functional tasks of the field device 10 on the one hand and communication operations within the field device 10 or with the outside world. An input/output unit 2 can be provided in order for example to connect the controller 1 to a central station such as a control center or a computer center. The field device 10 can communicate with the outside world via the input/output unit 2 using cryptographic keys.

Data having cryptographic protection can be sent and received for example via corresponding encryption with the aid of the input/output unit 2. Any well-known encryption technique can be used for the encryption, such as, for example, IPsec, SSL/TLS, MACsec, L2TP, PPTP, PGP, S/MIME or a similar technique having associated key management, such as e.g. IKE, EAP or other methods. For this purpose the field device 10 includes communication interfaces 3 which connect the input/output unit 2 to the outside world.

For example, a manipulation sensor 5 which can register or detect manipulation attempts or unauthorized interventions on the field device 10 can be connected to the input/output unit 2. If a manipulation attempt is detected, the manipulation sensor 5 transmits a corresponding signal via the input/output unit 2 to the controller 1, which can thereupon take corresponding safeguarding measures.

The field device 10 can also include a memory unit 4 which is connected to the controller 1. The memory unit 4 can be for example a memory chip in which configuration settings of the field device 10 can be permanently and rewritably stored, for example a serial EEPROM, a flash memory or a comparable memory device.

The field device 10 additionally includes a security module 7 on which security-relevant data such as cryptographic key data for use by the controller 1, for example, can be stored. The security module 7 can be for example an integrated circuit which possesses passive tamper protection, for example a passivation layer or manipulation sensors on the security module 7 itself. The security module 7 can be protected for example from manipulation attempts from outside by means of error-detecting and correcting measures for memory and bus communication, internal data encryption, irregular wiring masks or physically secured data storage. Conventional commercially available security chips can be used for example as the security module 7.

The field device 10 includes an interface unit 6 which is connected between the controller 1 and the security module 7 and which supports and monitors communication between the controller 1 and the security module 7 as a kind of hardware firewall. The interface unit can include for example an integrated circuit, a programmable logic device such as a GAL (Generic Array Logic), PAL (Programmable Array Logic), CPLD (Complex Programmable Logic Device) or FPGA (Field Programmable Gate Array), ASIC (Application Specific Integrated Circuit), or a microprocessor. The interface unit 6 can be coupled to the controller 1 for example via a data interface such as, for example, USB, a serial data bus such as I2C or a smartcard interface. The field device 10 can furthermore include a manipulation sensor 8 which is connected to the interface unit 6 and can detect manipulation attempts on the field device 10 or on parts of the field device 10 and pass corresponding manipulation signals to the interface unit 6. If a manipulation attempt is detected by the manipulation sensor 8, the interface unit 6 can automatically take suitable safeguarding measures in order to guarantee the confidentiality of the cryptographic key data in the security module 7. It can be possible for the manipulation sensor 8 to be provided in the field device 10 instead of the manipulation sensor 5. On the other hand it can also be possible for both manipulation sensors 5 and 8 to be arranged in the field device 10.

The field device 10 can additionally include a power supply unit (not shown) which supplies the interface unit 6 with electric power even when the field device 10 or the controller 6 is turned off, inactive or permanently or temporarily cut off from another power supply. For example, the power supply unit can have a (rechargeable) battery, a double-layer capacitor, such as, for example, a goldcap, an ultracap or a supercap, or a similar power supply unit. The power supply unit can be configured to supply the interface unit 6 at least temporarily with electric power. In this case provision can be made to guarantee the power supply to the interface unit 6 at least until the interface unit 6 has taken or completed suitable safeguarding measures to protect the confidentiality of the security-relevant data on the security module 7 in the event of a manipulation attempt. It can also be possible for the power supply unit to be integrated in the interface unit 6.

FIG. 2 shows a schematic representation of a field device 20 having a device for protecting a security module 7. The field device 20 differs from the described field device 10 shown in FIG. 1 in that the interface unit 6 and the security module 7 are embedded in a common manipulation-protected environment 21. The environment 21 can for example have full or partial physical manipulation protection, for example by being encapsulated by means of epoxy resin. In addition a further manipulation sensor 28 can be provided which is arranged inside the manipulation-protected environment 21 and is able to detect a manipulation, for example a penetration into the casting compound. The manipulation sensor 28 can for example include a special foil, referred to as a "tamper mesh" or "wire mesh". Foils of said type include conductor track grids which can be glued around devices requiring protection. A manipulation attempt on an environment 21 protected in such a way triggers interrupts and/or short-circuits which generate a corresponding signal. It should however be clear that a multiplicity of embodiments are possible for the manipulation sensor 28.

In the example of the field device 20 shown, the manipulation sensors 5 and 8 are not embedded in the manipulation-protected environment 21. It can nevertheless also be possible for one or both of the manipulation sensors 5 and 8 to be embedded in the manipulation-protected environment 21 as well. The controller 1 and the other components of the field device 20 are also not embedded in the manipulation-protected environment 21. This means for example that there is no need to encapsulate sensitive components, which makes the manipulation-protected environment 21 compact and cost-effective to implement.

FIG. 3 shows a schematic workflow of a method for communicating with a device for protecting a security module. In this case the method 30 can be performed in particular by a field device according to an embodiment as shown in one of FIG. 1 or 2.

In a first step 31, the controller 1 transmits a request containing an authentication to the interface unit 6. The authentication can include for example an activation code, a PIN or similar content by means of which the controller 1 can identify itself to the security module 7. In this case the interface unit 6 acts as receiver and consequently emulates the security module 7 to the controller 1. In a second step 32, the interface unit 6 forwards the request to the security module 7 provided no manipulation attempt has been detected, and the communication between the controller 1 and the security module 7 is classified as secure.

Following an authentication of the controller 1 in the security module 7, the security module 7 sends a confirmation response to the interface unit 6 in a third step 33, which response is forwarded to the controller 1 in a fourth step 34. Following the authentication, the controller 1 sends a random value, called a challenge, to the interface unit 6 in a fifth step 35, which challenge is forwarded by the interface unit 6 to the security module 7 in a sixth step 36. The challenge is processed further in the security module 7 with the aid of a cryptographic calculation using the cryptographic key data in order for example to generate a communication key. The calculation can entail for example an encryption, a calculation of a cryptographic checksum, formation of a hash value, a calculation of a digital signature, or a similar calculation. The calculation result is transmitted in a seventh step 37 from the security module 7 to the interface unit 6, which forwards the result to the controller 1 in an eighth step 38. The calculation result can be used by the controller 1 for example to set up cryptographically protected communication links.

The method workflow sequence 30 shown applies in the case where the connection between controller 1 and security module 7 is classified as secure by the interface unit 6, that is to say that no manipulation attempt has been detected by the interface unit 6. Immediately any such manipulation attempt is detected at any time during the communication between the controller 1 and the security module 7, the interface unit 6 can be configured to stop the transmission of data between the controller 1 and the security module 7. In this case it is possible to prevent the transmission of data between the controller 1 and the security module 6 entirely, or to prevent only the transmission of specific data. In the latter case the interface unit 6 analyzes data received in the course of a detected manipulation and forwards it only if it satisfies a predefined test criterion. This enables partial use of the security module 7 by the controller 1 even when a manipulation is detected.

FIG. 4 shows a schematic representation of a method 40 for protecting a security module, such as for example the security module 7 in FIGS. 1 to 3. In a first step 41, a request by a controller 1 of a field device, such as for example the field devices 10 or 20 in FIG. 1 or 2, for cryptographic key data of the security module 7 is sent to the interface unit 6. In a step 42, a check is thereupon carried out in the interface unit 6 to determine whether a manipulation attempt on the field device has been detected. For that purpose continuous monitoring for, for example, the presence of a manipulation signal can be carried out by a manipulation sensor that is connected to the interface unit 6, such as for example the manipulation sensors 8 and 28 in FIG. 2. Should no manipulation attempt have been detected, cryptographic key data of the security module 7 can be transmitted to the controller 1 by the interface unit 6 in a step 43 according to the method as shown in FIG. 3. If, on the other hand, a manipulation attempt has been detected, the transmission of the cryptographic key data of the security module 7 to the controller 1 is prevented by the interface unit 6 in a step 44. The transmission can be prevented for example in that the communication between the controller 1 and the security module 7 is completely blocked by the interface unit 6 or is restricted in parts. A corresponding gradation can be applied for example as a function of the severity of the manipulation attempt. It can also be possible that corresponding authentication codes such as a PIN, for example, will not be forwarded to the security module 7 by the interface unit 6 for as long as the security of the communication is not guaranteed. It can also be provided that in the event of a manipulation attempt being detected the interface unit 6 sends a blocking command to the security module 7 in order to prevent the disclosure of any security-relevant data by the security module 7 already by the security module 7 itself.

In a further step 45, it can also be possible that the interface unit 6 will physically erase the cryptographic key data in the security module 7 from the security module 7 via an erase command if a manipulation attempt is present. In this way it can be ensured that even in the event of an unauthorized removal or readout of the security module all the security-relevant data will already have been destroyed.

It can be provided that the corresponding security measures are already stored in advance as emergency measures in the interface unit 6 according to the severity or classification of a possible manipulation attempt, such that if a manipulation attempt occurs all the safeguarding measures can be initiated without delay. This enables the interface unit 6 to respond very rapidly to an attempted manipulation. In particular if the interface unit 6 can be constantly supplied with power at least temporarily by a power supply unit, it is not necessary to have to wait for the controller 1 to be activated first in order to initiate safeguarding measures. Even if the controller 1 fails due for example to the absence of a power supply or if the controller 1 is destroyed, all safeguarding measures can be performed autonomously by the interface unit 6.

The invention claimed is:

1. A protection device for protecting a security module from manipulation attempts in a field device, the protection device comprising:
    a controller configured for controlling the field device;
    a security module;
    a manipulation sensor for detecting whether a manipulation attempt is carried out on said field device;
    a hardware interface unit functionally connected between said controller and said security module, said manipulation sensor passing signals to said interface unit and said interface unit configured for checking to independently determine whether the manipulation attempt has been detected by said manipulation sensor and for taking suitable safeguarding measures in response to determining that the manipulation attempt has been detected, said interface unit configured for enabling said controller to access cryptographic key data made available in said security module when said interface unit has not determined that the manipulation attempt has been detected by said manipulation sensor, said interface unit configured for blocking communication between said controller and said security module in order to prevent access to the cryptographic key data when said interface unit has determined that the manipulation attempt has been detected by said manipulation sensor, said manipulation sensor connected to said interface unit and configured for indicating the manipulation attempt to said interface unit; and
    a power supply unit connected to said interface unit and configured for at least temporarily supplying said interface unit with electric power at least until said interface unit has completed the suitable safeguarding measures in response to determining that the manipulation attempt has been detected in order to thereby protect confidentiality of the cryptographic key data made available in said security module, said controller being powered by another power supply unit.

2. The device according to claim 1, wherein said security module and said interface unit are embedded in a manipulation-protected environment.

3. The device according to claim 2, wherein said manipulation sensor defines a first manipulation sensor, and further comprising:
    a second manipulation sensor connected to said interface unit, embedded in the manipulation-protected environment, and configured for detecting manipulation attempts on the manipulation-protected environment and for indicating the manipulation attempts to the interface unit.

4. The device according to claim 3, further comprising:
    an input/output unit connected to said controller and configured for providing an external communication of said controller;
    a third manipulation sensor connected to said input/output unit and configured for detecting manipulation attempts on the field device and for indicating the manipulation attempts to said controller; and
    a memory unit connected to said controller and configured for storing data used in said controller.

5. The device according to claim 1, further comprising:
    an input/output unit connected to said controller and configured for providing an external communication of said controller;
    a manipulation sensor connected to said input/output unit and configured for detecting manipulation attempts on the field device and for indicating the manipulation attempts to said controller; and
    a memory unit connected to said controller and configured for storing data used in said controller.

6. The device according to claim 1, wherein said interface unit is a programmable logic device.

7. A method of protecting a security module from manipulation attempts in a field device, the method which comprises:
    providing a field device with a protection device;
    providing the protection device with a controller configured for controlling the field device, a security module, a manipulation sensor, a hardware interface unit, a power supply unit, and a further power supply unit, wherein the protection device protects the security module from manipulation attempts;
    sending a request, by the controller in the field device for cryptographic key data of the security module, to the interface unit;
    detecting, with the manipulation sensor, whether a manipulation attempt is carried out on the field device and passing signals to said interface unit to indicate the manipulation attempt;

checking in the interface unit to independently determine whether a manipulation attempt on the field device has been detected;

in the interface unit, taking suitable safeguarding measures in response to determining that the manipulation attempt has been detected, wherein the safeguarding measures include blocking communication between the controller and the security module in order to prevent a transmission of the cryptographic key data in the security module to the controller by the interface unit;

when no manipulation attempt has been detected, transmitting the cryptographic key data of the security module to the controller by the interface unit; and at least temporarily powering the interface unit by e-Re the power supply unit at least until the interface unit has completed the suitable safeguarding measures in response to determining that the manipulation attempt has been detected in order to thereby protect confidentiality of the cryptographic key data in the security module, and powering the controller by the further power supply unit.

8. The method according to claim 7, which further comprises erasing the cryptographic key data in the security module by the interface unit if a manipulation attempt has been detected.

9. The method according to claim 7, wherein the step of sending the request includes authenticating the controller to the security module.

10. The method according to claim 9, wherein the step of inhibiting the transmission includes preventing the authentication of the controller to the security module by the interface unit.

11. The method according to claim 7, wherein the step of inhibiting the transmission includes blocking, by the interface unit, a communication of the controller with the security module.

12. The method according to claim 7, wherein the step of checking, carried out in the interface unit, to determine whether a manipulation attempt on the field device has been detected comprises evaluating a manipulation sensor connected to the interface unit.

13. The method according to claim 7, which further comprises:

at least temporarily supplying the interface unit with electric power from the one power supply unit if the other power supply unit supplying power to the controller has been interrupted or if the controller has been switched to inactive state.

14. A field device, comprising a protection device for protecting a security module from manipulation attempts in a field device, the protection device comprising:

a controller configured for controlling the field device;

a security module;

a manipulation sensor for detecting whether a manipulation attempt is carried out on said field device;

a hardware interface unit functionally connected between said controller and said security module, said manipulation sensor passing signals to said interface unit and said interface unit configured for checking to independently determine whether the manipulation attempt has been detected by said manipulation sensor and for taking suitable safeguarding measures in response to determining that the manipulation attempt has been detected, said interface unit configured for enabling said controller to access cryptographic key data made available in said security module when said interface unit has not determined that the manipulation attempt has been detected by said manipulation sensor, said interface unit configured for blocking communication between said controller and said security module in order to prevent access to the cryptographic key data when said interface unit has determined that the manipulation attempt has been detected by said manipulation sensor, said manipulation sensor connected to said interface unit and configured for indicating the manipulation attempt to said interface unit; and a power supply unit connected to said interface unit and configured for at least temporarily supplying said interface unit with electric power at least until said interface unit has completed the suitable safeguarding measures in response to determining that the manipulation attempt has been detected in order to thereby protect confidentiality of the cryptographic key data made available in said security module, said controller being powered by another power supply unit.

15. The device according to claim 1, wherein said manipulation sensor is directly connected to said interface unit.

16. The method according to claim 7, which further comprises directly connecting the manipulation sensor to the interface unit.

17. The field device according to claim 14, wherein said manipulation sensor is directly connected to said interface unit.

18. The method according to claim 7, which further comprises communicating externally from the field device with an input/output unit, wherein the field device includes the input/output unit, the controller, the security module, and the interface unit.

* * * * *